United States Patent [19]

Chevalier et al.

[11] 4,190,882
[45] Feb. 26, 1980

[54] SYSTEM FOR REDUCING THE EFFECTS OF POWER SUPPLY SWITCHING

[75] Inventors: Arthur C. Chevalier, Culver City; Arthur S. Zinkin, Rancho Palos Verdes; Robert Rosen, Granada Hills; Richard P. McGarrity, Woodland Hills, all of Calif.

[73] Assignee: Hughes Aircraft Company, Culver City, Calif.

[21] Appl. No.: 794,287

[22] Filed: May 5, 1977

[51] Int. Cl.$^2$ ............................................. H02M 3/28
[52] U.S. Cl. ...................................... 363/26; 363/41; 363/96; 363/97
[58] Field of Search .................................. 363/22–28, 363/38–42, 86, 96, 97; 323/DIG. 1

[56] References Cited

U.S. PATENT DOCUMENTS

| | | | |
|---|---|---|---|
| 3,260,921 | 7/1966 | Brahm | 363/41 |
| 3,406,328 | 10/1968 | Studtmann | 363/41 |
| 3,735,235 | 5/1973 | Hamilton et al. | 363/26 |
| 3,742,330 | 6/1973 | Hodges et al. | 363/41 |
| 3,821,630 | 6/1974 | Kornrumpf et al. | 363/96 X |
| 3,859,586 | 1/1975 | Wadlington | 363/25 X |
| 3,913,000 | 10/1975 | Cardwell, Jr. | 363/24 X |
| 3,959,710 | 5/1976 | Hill, Jr. | 363/41 |
| 4,050,006 | 9/1977 | Stich | 363/124 X |

OTHER PUBLICATIONS

*Electronics Design 6*, "Choose Switching Regulators," Mar. 15, 1975, pp. 54–58.

*Primary Examiner*—William M. Shoop
*Attorney, Agent, or Firm*—Walter J. Adam; W. H. MacAllister

[57] ABSTRACT

A power supply arrangement that substantially eliminates the effects of the sidebands and harmonics at the switching frequency of the power supply on the RF carrier of an amplifier or other unit being supplied power. The switching frequency of the power supply arrangement is continuously varied in frequency at an appropriate rate and deviation with the result that a band of frequencies replaces the fundamental switching frequency of the power supply and all harmonics so that noise created by the switching frequency signal and the RF signal are then similarly diffused. The net power present as spurious noise in the amplifier unit is constant with the maximum amplitude of the noise as viewed, for example, in a doppler filter being substantially reduced. In a radar transmitter, for example, the transmitted pulse frequency appears as PRF sidebands of the CW frequency and the extraneous modulation from the switched power supply provides sidebands of the PRF sidebands. At each of these PRF sidebands, the switching frequency modulation, in accordance with the invention, causes the sidebands resulting from the switching frequency to be spread over a relatively wide band so as to substantially decrease the amplitude of the spurious signals.

6 Claims, 8 Drawing Figures

SYSTEM FOR REDUCING THE EFFECTS OF POWER SUPPLY SWITCHING

BACKGROUND OF THE INVENTION

1. Field of the Invention

This invention relates to power supply systems and particularly to a power supply that reduces the effects of sidebands in an RF signal unit caused by spectral lines at the power supply switching frequency.

2. Description of the Prior Art

In conventional power supply arrangements, supplying power to units that amplify an RF carrier, rectified power is applied to a pulsed or switched switching regulator, converted into a chain of pulses and then after passing through a suitable power transformer is rectified and filtered to provide the regulated voltage source for the RF carrier unit. The power supply switching frequency is normally a stable fixed frequency. However, the switching fundamental frequency and its harmonics create a residual noise level after mixing with the RF carrier even after passive and active filtering in the power supply. The extraneous or switching frequency signal frequency and amplitude modulates the RF signal and its sidebands to a degree that causes noticeable sidebands offset from the RF signal and sidebands thereof by the switching frequency. Thus, for example, in a doppler radar system the sidebands resulting from the switching frequency may cause undesired detection of target signals in the doppler filters. It would be a substantial advantage to the art if a switched or pulsed power supply were provided that eliminated the undesirable effects of switching frequency on an RF carrier and its sidebands.

SUMMARY OF THE INVENTION

A switched or pulse power supply arrangement that reduces the effects of power supply ripple in an RF carrier unit such as an amplifier or a pulse forming unit by varying the power supply switching pulse rate in an appropriate pulse rate and deviation rate. The arrangement may include a power supply responding to a rectified voltage, a regulator and a DC to AC converter with either the regulator or converter or both being switched, a transformer and suitable rectification and filtering circuits. Switching is performed at a continuously varying rate, the rate limits being selected as a function of the bandwidth and other characteristics of the components of the driven loads. The switching frequency sidebands which may appear as harmonics or sub-harmonics of the RF carrier or its harmonics by frequency or amplitude modulation of the RF carrier are replaced by a band of harmonics having a substantially reduced amplitude. The net power present as spurious noise will be constant but the maximum amplitude of the noise as viewed, for example, in a doppler filter will be substantially less than with a constant switching frequency. The amplitude of the band of sidebands is a function of the modulation or deviation rate of the switching pulses of the power supply and the center frequency of the band of harmonics resulting from the switching frequency is at the center of the modulated pulse rate frequencies. The low amplitude of the noise resulting from the power supply arrangement is suitable in any unit involved with the generation or amplification of an RF signal and, for example, in a transmitter for a doppler radar system, the radar detection range is improved and in a track-while-scan mode the false alarm rates and false tracks are minimized.

It is therefore an object of this invention to provide an improved switched or pulsed power supply.

It is a further object of this invention to provide a switched power supply system that reduces the effects of power supply ripple in any suitable RF carrier unit.

It is a still further object of this invention to provide a pulsed power supply that is controlled so that the net power present as spurious noise in a RF signal amplifier unit will be substantially reduced.

It is another object of this invention to provide an improved pulse power supply for use in a radar transmitter so that the noise detected in each doppler filter will be substantially reduced.

BRIEF DESCRIPTION OF THE DRAWINGS

These and other objects, features and advantages of the invention itself, will become apparent to those skilled in the art in the light of the following detailed description taken in consideration with the accompanying drawings, wherein like reference numerals indicate like corresponding parts throughout the several parts wherein.

DETAILED DESCRIPTION OF THE INVENTION

Figure 1:
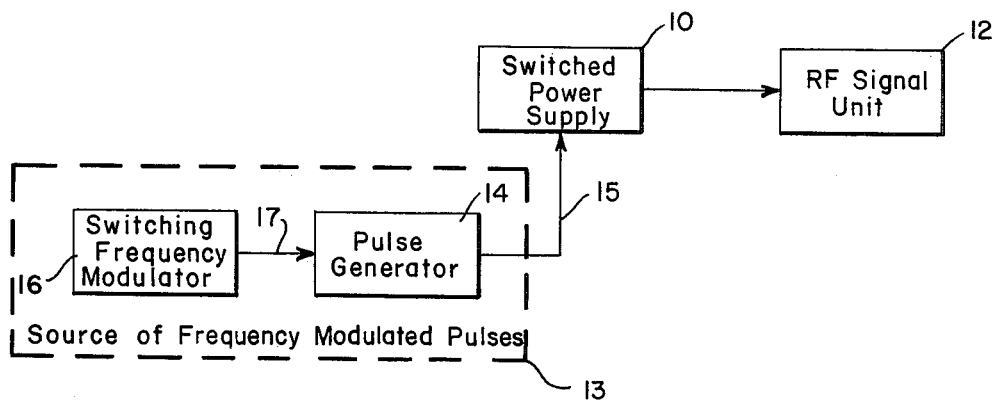
FIG. 1 is a schematic block diagram illustrating the improved power supply, in accordance with the invention.

Referring first to FIG. 1, a switched or pulsed DC power supply 10 provides a regulated voltage to an RF signal unit 12 which may be any suitable supplied or utilization unit such as an RF power amplifier including a transmitter or any unit which requires power to be supplied thereto for amplifying or processing an RF signal. For example, if the unit 12 is a radar transmitter, it may include a suitable traveling wave tube (TWT), a crossed field amplifier, a Klystron amplifier or any suitable type of microwave amplifier that is required to be supplied with power. The switched power supply 10 within the scope of the invention is any power supply that utilizes switching or pulsing for generation of a regulated DC voltage. A pulse generator 14 in a source of frequency modulated pulses 13, supplies a continuous stream of pulses through a lead 15 to the power supply 10 and in accordance with the invention at a pulse repetition frequency which is continuously modulated at a selected repetition rate. A switching frequency modulator 16 applies modulation control signals through a lead 17 to the pulse generator 14 which, for example, may be a suitably selected voltage controlled oscillator. The switching frequency modulator 16 may provide any suitable type of variable voltage such as repetitive triangular wave, a sine wave, a saw-tooth wave or may be a psuedo-random or random source or any other type of suitable statistical source that will provide a continuous variation over a selected frequency range of the frequency of the pulses generated by the generator 14 and applied through the lead 15 to the power supply 10. By continuously varying the frequency of the pulses on the lead 15, the fundamental switching frequency which provides undesired sidebands in the RF signal unit 12 principally from frequency modulation effects but also from amplitude modulation effects, is replaced by a band of frequencies with those signals of significant amplitude spread over a band equal to the pulse rate modulation of the modulated pulses controlling the power supply 10. The pulse generator 14, for example, may be a wavetek Model 144 unit which operates as a square-wave generator and is responsive to a triangular wave on the lead 17.

Figure 4:
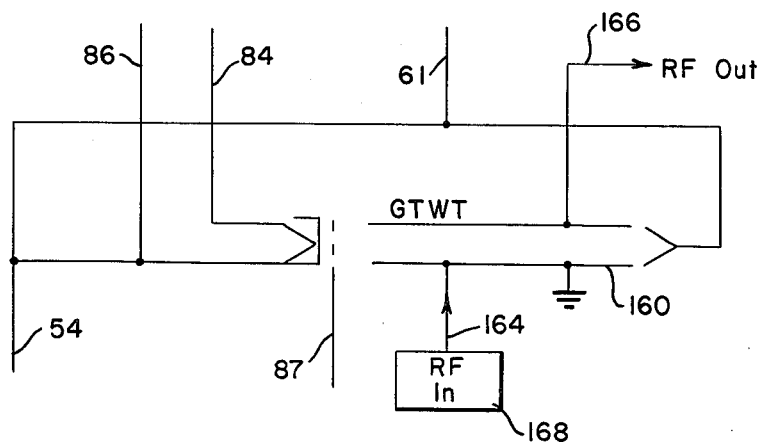
FIG. 4 is a schematic circuit and block diagram showing a gridded traveling wave tube that may be supplied by the arrangement of FIG. 2.
Figure 2:
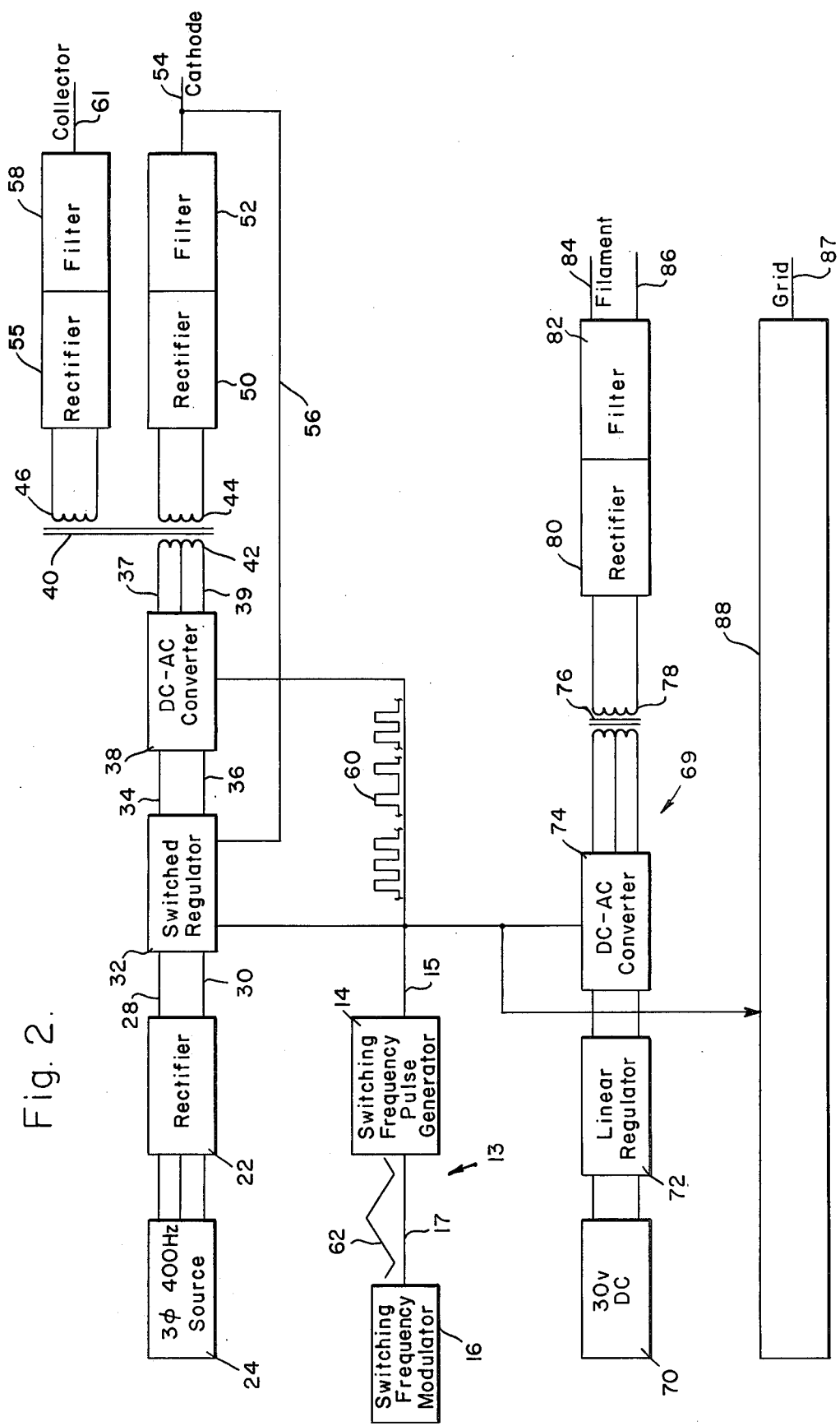
FIG. 2 is a schematic block and circuit diagram further illustrating the power supply of FIG. 1 utilized for supplying power to a transmitter.

Referring now to FIG. 2, the power supply concept in accordance with the invention is illustrated generating power for a gridded traveling wave tube in a radar transmitter as shown in FIG. 4. In the illustrated power supply for supplying power to the collector and cathode of the gridded traveling wave tube, a rectifier 22 responds to a suitable source illustrated as a three-phase 400 hertz source 24 to provide a rectified voltage on leads 28 and 30 which in turn are coupled to a switched regulator 32. The output voltages of the switched regulator 32 are applied through leads 34 and 36 to a DC to AC converter 38 and in turn through an appropriate step-up high voltage transformer 40 which is illustrated with a primary lead 42 and secondary leads 44 and 46. The high voltage outputs sensed by the leads 44 and 46 are respectively applied through a rectifier 50 and a filter 52 to a cathode lead 54 and through a rectifier 55 and a filter 58 to a collector lead 61.

In the illustrated arrangement, a feedback lead 56 is provided from the cathode lead 54 to the switching regulator 32 to control the duty cycle. Because the cathode is more critical than the collector as to ripple and noise effects, the feedback lead 56 is preferably coupled thereto. The lead 15 applies the switching pulses to both the switching regulator 32 and the DC to AC converter 38 as shown by a pulse train of a waveform 60 varying in pulse repetition frequency as a function of time in both an increasing and a decreasing direction in response to an illustrated triangular signal of a waveform 62 provided by the modulator 16. The filament and grid power supplies 69 and 88 which are both similar, includes a DC source 70 which may include a rectifier responding to a 3 phase source, for example. The DC source 70 applies DC power to a linear regulator 72 which in turn applies a regulated voltage to a DC to AC converter 74 for applying an AC signal to an input winding of a power transformer 76. The high voltage AC pulses provided by a secondary winding 78 are then applied through a rectifier 80 and through a suitable filter 82 to output leads 84 and 86 providing a return path for current because of the floating filament in the gridded traveling wave tube of FIG. 3. The grid power supply 88 is similar to the filament power supply and need not be shown in detail. The DC to AC converter 74 and a similar converter in the grid power supply 88 are supplied by the modulated pulses from the lead 15. The linear regulator 72 may be any suitable regulator such as a basic regulator illustrated on page 95 of the Voltage Regulator Handbook of May 1975 published by the National Semiconductor Corporation.

Figure 3:
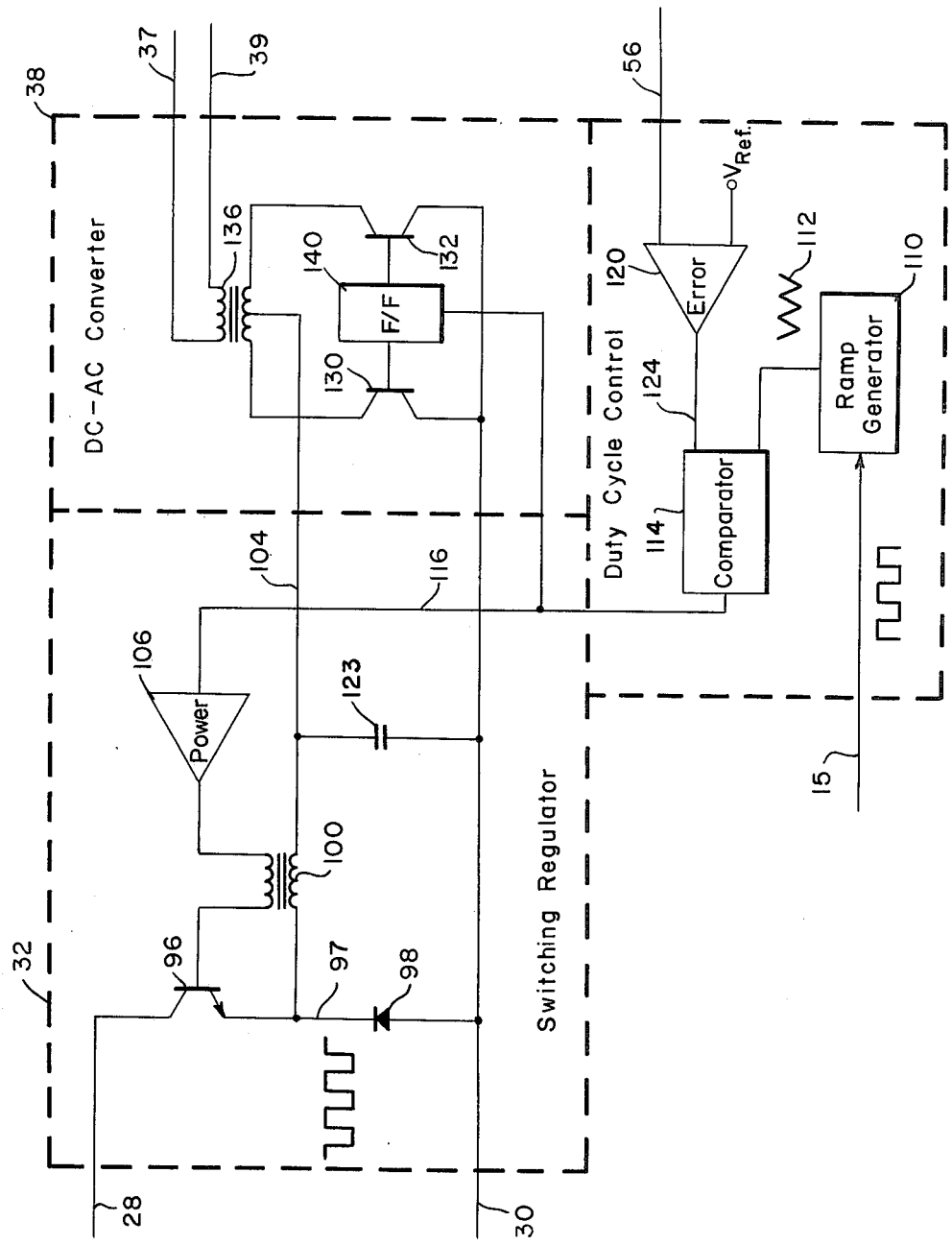
FIG. 3 is a schematic circuit and block diagram showing an illustrative example of the pulsed switching regulator and DC to AC converter of FIG. 2.

Referring now to FIG. 3, an illustrative example of the switching regulator 32 and the DC to AC converter 38 or the converter 74 will be explained. The illustrated switching regulator 32 includes a power transistor 96 with its collector coupled to the lead 28 and its emitter coupled through the cathode to anode path of a flyback diode 98 to a lead 30. A choke coil provided by a first winding of a transformer 100 is coupled between the lead 97 and an output lead 104 with a secondary winding of the transformer 100 coupled between a power amplifier 106 and the base of the transistor 96. The switching pulses of a lead 15 are applied to a ramp generator 110 which applies ramp signals of waveform 112 to a comparator 114 which is in turn coupled through a lead 116 to the power amplifier 106. The other input to the comparator 114 is the feedback signal from the cathode lead that is provided through the lead 56 to an error amplifier 120 referenced to a voltage source $V_{Ref}$, which then applies feedback signals through a lead 124 to the other input of the comparator 114. Depending on the voltage level on the lead 116, the pulses out of the comparator 114 have a varying width so that as greater power is required the pulse width becomes wider. An output capacitor 123 is coupled between the leads 104 and 30 for storing the regulated charge. In operation when the transistor 96 is biased into conduction, current flows through the transistor 96 and through the second winding of the transformer 100 with the return current flowing through the lead 30 and into the capacitor 123. When the transistor 96 is biased off, the current flows from the lead 30 through the flyback diode 98 and into the choke coil of the transformer 100. Thus, it is to be noted that the duty-cycle circuit including the comparator 114 changes the period that the transistor 96 is biased on but does not effect the pulse rate as provided by the switching frequency pulse generator 14. If the regulator 32 does not utilize the duty-cycle circuit, which is within the scope of the invention, then the switching pulses of the lead 15 are applied directly to the lead 116.

The illustrated DC to AC converter includes transistors 130 and 132 having their emitters coupled to the lead 30 and having their collectors coupled to opposite ends of a primary winding of a transformer 136. The secondary winding of the transformer 136 is coupled to output leads 37 and 39. The switching frequency pulses on the lead 116 are applied to a one sided flip-flop 140 to alternately provide on and off pulses to the bases of the transistors 130 and 132 so that an AC signal of the DC signal of the lead 104 is applied to the output leads 37 and 39. It is to be noted that the switching regulator and the DC to AC converter of FIG. 4 are only for illustrative purposes and the invention is equally applicable to any suitable type of switching regulator and DC to AC converter.

Referring now to FIG. 4, a gridded traveling wave tube that may be utilized in the system in accordance with the invention when supplying power as a radar transmitter will be further explained. A gridded traveling wave tube (GTWT) 160 may be any suitable type such as a high power pulse TWT No. 756H supplied by the Electron Dynamics Division of Hughes Aircraft Company. The cathode lead 54 and the grid lead 87 respectively applied to the cathode and grid and the filament leads 84 and 86 are respectively applied to the grid and the cathode of the tube 160. The collector lead is applied both to the collector and to the grid. In operation, the RF input pulse formed from a CW signal is applied through a suitable waveguide 164 to the tube and after power amplification is passed through a suitable waveguide 166 to an antenna, for example. The pulsing of the CW signal is well known in the art and is performed in a pulsing unit 168.

Figure 5A:
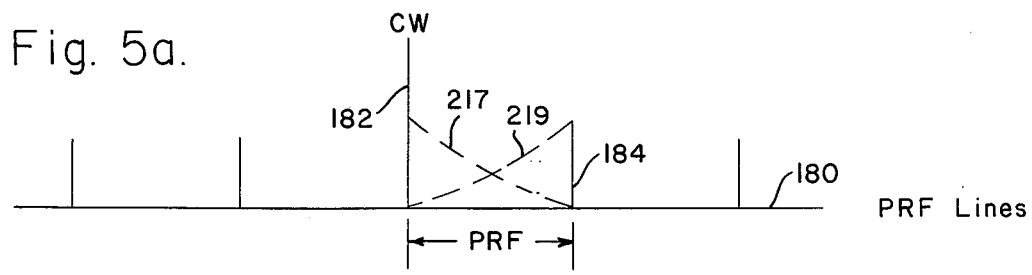
FIGS. 5a to 5c are schematic illustrations of spectral diagrams for further explaining the operation of the improved power supply in accordance with the invention.
Figure 5B:
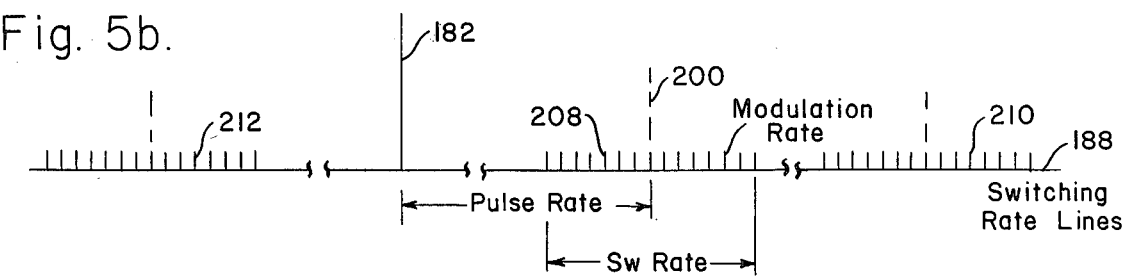
Figure 5C:
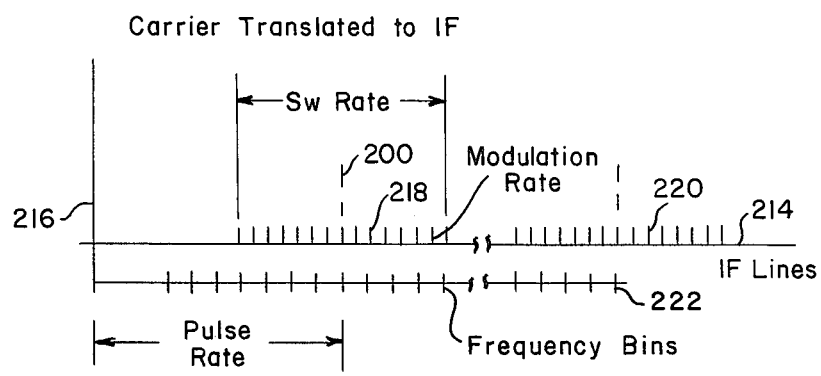
Figure 6:
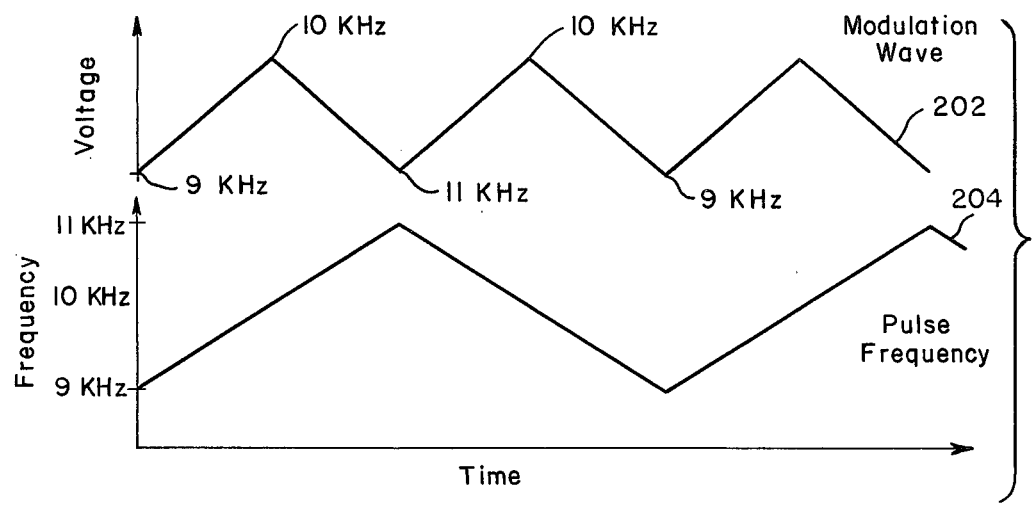
FIG. 6 is a schematic diagram of voltage and frequency as a function of time for further explaining the pulse modulation that may be utilized in the power supply arrangement in accordance with the invention.

Referring now to FIGS. 5a, 5b and 5c, a spectral diagram 180 shows the CW (continuous wave) spectral line 182 representing the CW signal that may be generated in the RF input pulse unit 168 (FIG. 4) of the transmitter and a spectral line 184 that, for example, may be a PRF sideband at 100 Kilohertz from the line 182 caused by the pulse repetition frequency (PRF) of the transmitter. Additional PRF sidebands, both upper and lower, are shown in the spectral diagram 180 for illustrative purposes. The switching rate spectral lines are shown by a spectral diagram 188 with a CW carrier line 182 shown and with the diagram drawn with a scale so that the first PRF sideband such as 184 is not shown. In response to the pulse rate of the switching in the power supply without the pulse rate modulation, in accordance with the invention, a switching sideband 200, shown dotted, will be formed as a result of the switching pulse rate of the power supply frequency modulating the carrier or spectral line 182. The pulse rate of the power supply modulation may, for example, be 10 Kilohertz and a plurality of harmonics and sub-harmonics would be provided as a result of the mixing with the CW frequency of the spectral line 182. Temporarily referring to FIG. 6, the modulation wave on the lead 17 applied to the pulse generator 14 is illustrated by a waveform 202 and, for example, may be a 60 cycle signal varying between 9 and 11 Kilohertz or a total of 2 Kilohertz. The pulse frequency variation on the lead 15 is illustrated by a waveform 204 and varies cyclically at a selected modulation rate, a modulation cycle being shown. As shown by the diagram 188 of FIG. 5b, the switching rate which is 2 Kilohertz in the illustrated example determines the spreading out of the frequency band with a plurality of modulation lines 208 adjacent lines separated by the modulation rate which, for example, may be 60 cycles. The amplitude of the modulated lines such as 208 is greatly attenuated because the total energy which remains constant is spread over the wide spectral band and it had been found that the lesser the modulation rate for the same switching rate deviation, the lower the amplitude of this spreadout spectrum. The lower limit of the modulation deviation, however, may be controlled by the allowed size of the transformer 40 of FIG. 2 as well as by response time requirements in other portions of a radar system. The upper limit of the modulation or deviation rate may be controlled by the hysteresis losses of the transformer 40. Additional frequency modulation regions as sidebands of the spectral line 182 at repetition frequencies of the modulated pulse rate are shown at 210 and 212. For amplitude modulation (AM) noise, which is substantially less than FM noise, signal spectral lines which are formed as a result of the switching frequency have their power, whicn is constant, spread over a bandwidth of many spectral lines. Thus, the concept of the invention provides an improvement in the effect of AM noise as well as FM noise.

A spectral diagram 214 shows the RF signal with the carrier translated in a radar receiver (not shown) to an IF frequency such as 30 Megahertz illustrated by a line 216. As well known in the art, when translating the signal to intermediate frequency (IF) folding of the spectrum occurs around the carrier 182 and sidebands such as 184 of FIG. 5a with the folding that will occur at IF frequency being indicated by dotted lines 217 and 219. The noise sideband modulations at IF are shown at 218 for the first sideband region and at 220 for the second sideband region. Doppler filters and frequency bins are illustrated by lines 222 and it can be seen that without the power supply modulation in accordance with the invention, a switching sideband shown by a dotted line 200 may cause false ringing of a doppler filter and a false indication of a target. With the switching pulse rate modulation in accordance with the invention, a band of frequencies replaces the fundamental switching frequency and all harmonics of the band are diffused to a relatively low amplitude. The net power present as spurious noise is the same as with a single sideband so that in the sideband region such as 218, the maximum amplitude of the noise is substantially less than with the constant switching frequency.

Thus, there has been described an improved power supply that by causing the switching frequency of the switch components in the power supply to continuously vary in frequency at an appropriate rate and deviation, a band of frequencies replaces the fundamental switching frequency and all harmonics are spread out over a spectral band. Because the power is constant for the frequency modulation, the amplitude of the spread-out switching frequency band is substantially decreased and the effects of power supply ripple are minimized. The amplitude modulation effects may be relatively small but the net result is that the amplitude of the noise that results from amplitude modulation by the power supply ripple is substantially reduced by spreading the power over a spectral band similar to the effect on FM noise. It is to be understood that the principles of the invention are not to be limited to any particular utilization device such as the illustrated transmitter but may be utilized in any utilization device in which power is supplied to a unit having an RF signal which is to be amplified or processed. Also, the principles of the invention are equally applicable to both voltage and current regulators.

What is claimed is:

1. A DC power supply for providing power to a utilization device comprising:

a source of AC power, rectifier means coupled to said source of AC power, a switching regulator coupled to said rectifier means and being responsive to switching pulses applied to a terminal, said switching regulator responding to the pulse width of said switching pulses to provide a DC voltage, a source of modulated pulses for providing modulated pulses to form said switching pulses, said modulated pulses and said switching pulses having a pulse repetition frequency that is continuously modulated over a selected frequency range, control means coupled to the terminal of said switching regulator and being responsive to said modulated pulses and a feedback voltage to provide said switching pulses having pulse repetition frequencies determined by said modulated pulses and pulse widths determined by said feedback voltage, a DC to AC converter coupled to said switching regulator for responding to said DC voltage, transformer means coupled to said DC and AC converter, and rectifier and filter means coupled between said transformer means and said utilization device and providing said feedback voltage.

2. The combination of claim 1 in which said source of modulated pulses includes means to modulate the pulse repetition frequency of said pulses at a predetermined modulation rate.

3. The combination of claim 1 in which said DC to AC converter has a terminal responsive to said switching pulses and said control means is also coupled to said terminal of said DC to AC converter.

4. The combination of claim 3 in which said control means includes a comparator responsive to a ramp generator and to an error determining circuit, said ramp generator and said error determining circuit being respectively responsive to said modulated pulses and to said feedback voltage.

5. The combination of claim 1 in which said source of modulated pulses includes a pulse generator controlled by a switching frequency modulator, said modulation of the pulse repetition frequency over a selected frequency range having a predetermined repetition frequency.

6. The combination of claim 3 in which said source of modulated pulses includes a pulse generator controlled by a pulse frequency modulator to provide said modulated pulses at a pulse repetition frequency that is continuously modulated at a predetermined modulation rate.

* * * * *